(12) United States Patent
Kim

(10) Patent No.: US 8,854,461 B2
(45) Date of Patent: Oct. 7, 2014

(54) METHOD OF CONTROLLING CAMERA

(75) Inventor: Su-young Kim, Changwon (KR)

(73) Assignee: Samsung Techwin Co., Ltd., Changwon (KR)

( * ) Notice: Subject to any disclaimer, the term of this patent is extended or adjusted under 35 U.S.C. 154(b) by 447 days.

(21) Appl. No.: 13/353,909

(22) Filed: Jan. 19, 2012

(65) Prior Publication Data

US 2012/0188388 A1    Jul. 26, 2012

(30) Foreign Application Priority Data

Jan. 20, 2011   (KR) ........................ 10-2011-0005988

(51) Int. Cl.
- *H04N 7/18* (2006.01)
- *H04N 5/225* (2006.01)
- *G01S 13/86* (2006.01)
- *H04N 5/232* (2006.01)

(52) U.S. Cl.
CPC .............. *H04N 5/232* (2013.01); *G01S 13/867* (2013.01)
USPC ........................................ 348/143; 348/169

(58) Field of Classification Search
None
See application file for complete search history.

(56) References Cited

U.S. PATENT DOCUMENTS

| | | | |
|---|---|---|---|
| 7,098,997 B2 * | 8/2006 | Shirai et al. | 356/3.01 |
| 7,425,983 B2 * | 9/2008 | Izumi et al. | 348/143 |
| 7,529,387 B2 * | 5/2009 | Kotake et al. | 382/103 |
| 7,706,978 B2 * | 4/2010 | Schiffmann et al. | 701/301 |
| 8,049,658 B1 * | 11/2011 | Lagonik et al. | 342/52 |
| 2008/0118104 A1 * | 5/2008 | Ariyur et al. | 382/103 |

FOREIGN PATENT DOCUMENTS

| | | |
|---|---|---|
| JP | 2009-186260 A | 8/2009 |
| KR | 10-0720595 B1 | 5/2007 |
| KR | 10-0954739 B1 | 4/2010 |

\* cited by examiner

*Primary Examiner* — Justin P Misleh
(74) *Attorney, Agent, or Firm* — Sughrue Mion, PLLC

(57) ABSTRACT

A method of controlling a camera to photograph a target, the method including: obtaining position information about a plurality of reference points which are positioned around the target; obtaining panning angles and tilting angles of the camera for the reference points; obtaining position information about the target from information about the target which is received from a radar device; obtaining a panning angle and tilting angle of the camera for the target, based on the position information about the reference points, the panning angles and tilting angles of the camera for the reference points, and the position information about the target; and controlling panning and tilting of the camera based on the panning angle and tilting angle of the camera for the target.

15 Claims, 5 Drawing Sheets

METHOD OF CONTROLLING CAMERA

CROSS-REFERENCE TO RELATED PATENT APPLICATION

This application claims priority from Korean Patent Application No. 10-2011-0005988, filed on Jan. 20, 2011, in the Korean Intellectual Property Office, the disclosures of which are incorporated herein in their entirety by reference.

BACKGROUND

1. Field

Methods consistent with exemplary embodiments relate to controlling a camera, and more particularly, to controlling a camera to photograph a target according to target information obtained by using a radar device.

2. Description of the Related Art

A camera for interacting with a radar device may be installed around a surveillance area of the radar, i.e., a region of interest (ROI).

However, inclination information and position information about the camera should be precisely and correctly obtained to allow the camera to track the target by interacting with the radar.

Particularly, since it is impossible to obtain altitude information about the camera by using a two dimensional radar device that is generally used for ground surveillance, there is a difficulty in installing a camera to interact with the two dimensional radar.

SUMMARY

The present invention provides a method of controlling a camera, which allows the camera to track a target by interacting with a radar device without obtaining inclination information and position information about the camera.

According to an aspect of an exemplary embodiment, there is provided a method of controlling a camera to photograph a target, the method including: obtaining position information about a plurality of reference points which are positioned around the target; obtaining panning angles and tilting angles of the camera for the reference points; obtaining position information about the target from information about the target which is received from a radar device; obtaining a panning angle and tilting angle of the camera for the target, based on the position information about the reference points, the panning angles and tilting angles of the camera for the reference points, and the position information about the target; and controlling panning and tilting of the camera based on the panning angle and tilting angle of the camera for the target.

The obtained position information about the reference points, and the obtained panning angles and tilting angles of the camera for the reference points may be stored in a host device of the camera or in the camera, and the host device of the camera or a control unit in the camera may perform the obtaining the position information about the target, the obtaining the panning angle and tilting angle of the camera for the target, and the controlling the panning and tilting of the camera.

The method of controlling the camera to photograph the target may further include: obtaining a zoom magnification and a focus value of the camera which correspond to the panning angle and tilting angle of the camera for the target; and controlling zooming and focusing of the camera based on the zoom magnification and focus value.

The obtaining the panning angle and tilting angle of the camera for the target may include: obtaining the panning angle of the camera for the target based on the position information about the reference points, the panning angles of the camera for the reference points, and the position information about the target; and obtaining the tilting angle of the camera for the target based on the position information about the reference points, the tilting angles of the camera for the reference points, and the position information about the target.

The reference points may include a first reference point and a second reference point, wherein a horizontal position of the target may exist on a horizontal line connecting a horizontal position of the first reference point to a horizontal position of the second reference point in a straight line, and a vertical position of the target may exist on a vertical line connecting a vertical position of the first reference point to a vertical position of the second reference point in a straight line.

The obtaining the panning angle of the camera for the target may include calculating the panning angle of the camera for the target which correspond to a ratio of a horizontal distance between the first reference point and the horizontal position of the target to a horizontal distance between the first reference point and the second reference point, on the horizontal line.

The obtaining the tilting angle of the camera for the target may include calculating the tilting angle of the camera for the target which correspond to a ratio of a vertical distance between the first reference point and the vertical position of the target to a vertical distance between the first reference point and the second reference point, on the vertical line.

The obtaining the panning angle and tilting angle of the camera for the target may be performed using a first reference point and a second reference point, among the reference points, between which a horizontal distance passing through the target is shortest, wherein a horizontal position of the target may exist on a horizontal line connecting a horizontal position of the first reference point to a horizontal position of the second reference point in a straight line, and wherein the obtaining the panning angle of the camera for the target may include calculating the panning angle of the camera for the target which corresponds to a ratio of a horizontal distance between the first reference point and the horizontal position of the target to a horizontal distance between the first reference point and the second reference point, on a horizontal line.

The obtaining the panning angle and tilting angle of the camera for the target may be performed using a first reference point and a second reference point, among the reference points, between which a vertical distance passing through the target is shortest, wherein a vertical position of the target may exist on a vertical line connecting a vertical position of the first reference point to a vertical position of the second reference point in a straight line, and wherein the obtaining the tilting angle of the camera for the target may include calculating the tilting angle of the camera for the target which corresponds to a ratio of a vertical distance between the first reference point and the vertical position of the target to a vertical distance between the first reference point and the second reference point, on a vertical line.

According to exemplary embodiments, a panning angle and a tilting angle for a target are obtained based on position information about reference points, panning angles and tilting angles of a camera for the reference points, and position information about the target. That is, the panning angle and tilting angle of the camera for the target are obtained by using the reference points.

Thus, a camera may track the target by interacting with a radar device without obtaining inclination information and position information about the camera.

Accordingly, it may be possible to resolve a difficulty of the related art, whereby inclination information and position information about a camera should be precisely and correctly obtained to allow the camera to track a target by interacting with the radar device. Particularly, it may be possible to resolve a difficulty in installing a camera to interact with a two dimensional radar which is not capable of obtaining altitude information about the camera.

BRIEF DESCRIPTION OF THE DRAWINGS

The above and other aspects of the inventive concept will become more apparent by describing in detail exemplary embodiments with reference to the attached drawings in which.

DETAILED DESCRIPTION OF THE EXEMPLARY EMBODIMENTS

Figure 1:
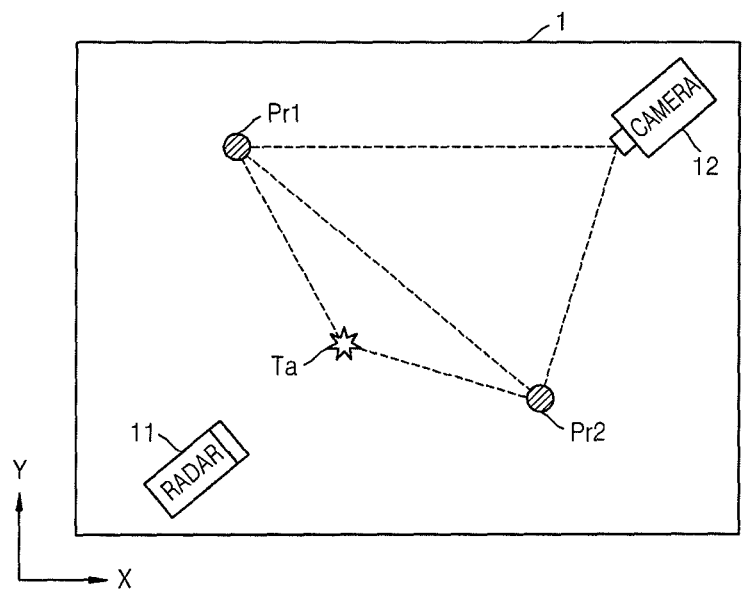
FIG. 1 is a two dimensional map diagram showing that two reference points are set, which is used in a method of controlling a camera, according to an exemplary embodiment.

Exemplary embodiments will now be described more fully with reference to the accompanying drawings. The inventive concept may, however, be embodied in many different forms and should not be construed as being limited to the exemplary embodiments set forth herein; rather, these embodiments are provided so that this disclosure will be thorough and complete, and will fully convey the inventive concept to those of ordinary skill in the art. In the present specification, like reference numerals and symbols refer to like elements throughout.

As used herein, the term "and/or" includes any and all combinations of one or more of the associated listed items. Expressions such as "at least one of," when preceding a list of elements, modify the entire list of elements and do not modify the individual elements of the list.

FIG. 1 is a two dimensional diagram of a map showing that two reference points Pr1 and Pr2 are set, which is used in a method of controlling a camera 12, according to an exemplary embodiment. In FIG. 1, a reference numeral 1 indicates a two dimensional plane on the map. The method of controlling the camera 12 according to the current embodiment is described below with reference to FIG. 1.

First, a plurality of reference points, for example, the two reference points Pr1 and Pr2, which are positioned around a surveillance area for a target Ta, are set. In addition, panning angles and tilting angles of the camera 12 for the plurality of reference points Pr1 and Pr2 are obtained. The panning angles and tilting angles and position information, such as position coordinates, about the plurality of reference points Pr1 and Pr2 are stored in a host device (not shown) of the camera 12 or the camera 12.

The host device of the camera 12 and the camera 12 are connected to each other through a communication network, and perform real time communication between them.

Next, the host device of the camera 12 or a control unit in the camera 12 obtains position information, such as a position coordinates, about the target Ta from target information when the target information is received from a radar device 11.

Next, the host device of the camera 12 or the control unit in the camera 12 obtains a panning angle and a tilting angle of the camera 12 for the target Ta, based on the position information about the reference points Pr1 and Pr2, the panning angles and the tilting angles of the camera 12 for the reference points Pr1 and Pr2, and the position information about the target Ta.

In detail, a panning angle of the camera 12 for the target Ta is obtained based on the position information about the reference points Pr1 and Pr2, the panning angles of the camera 12 for the reference points Pr1 and Pr2, and the position information about the target Ta. In addition, a tilting angle of the camera 12 for the target Ta is obtained based on the position information about the reference points Pr1 and Pr2, the tilting angles of the camera 12 for the reference points Pr1 and Pr2, and the position information about the target Ta.

A zoom magnification and a focus value, which correspond to the panning angle and the tilting angle for the target Ta, may be additionally obtained.

Next, the host device of the camera 12 or the control unit in the camera 12 controls panning and tilting of the camera 12 based on the obtained panning angle and tilting angle. Zooming and focusing of the camera 12 may be additionally controlled based on the zoom magnification and the focus value.

In summary, the panning angle and the tilting angle for the target Ta are obtained by using the reference points Pr1 and Pr2.

Thus, the camera 12 may track the target Ta by interacting with the radar device 11 without obtaining inclination information and position information about the camera 12.

Accordingly, it may be possible to resolve a difficulty in the related art, whereby inclination information and position information about a camera should be precisely and correctly obtained to allow the camera to track a target by interacting with a radar device. Particularly, it may be possible to resolve a difficulty in installing a camera to interact with a two dimensional radar device which is not capable of obtaining altitude information about the camera.

Below, the method of controlling the camera according to the current embodiment is described in more detail.

Figure 2:
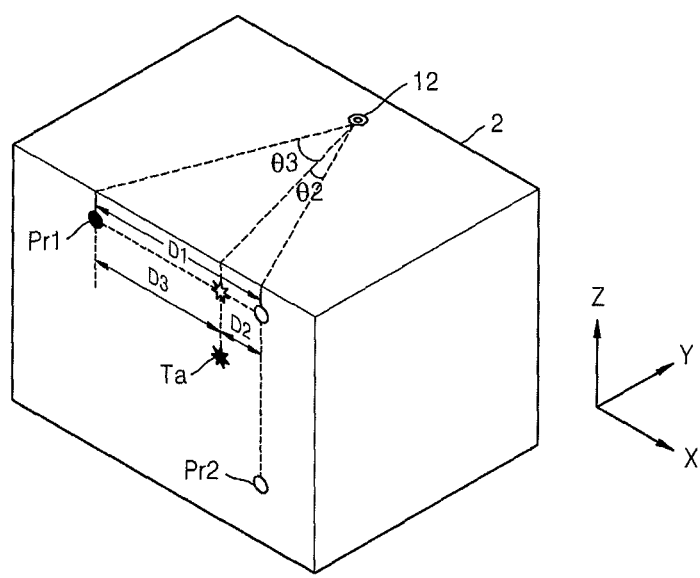
FIG. 2 is a three dimensional diagram for explaining a method of obtaining a panning angle of a camera with respect to a target, which is used in a method of controlling a camera, according to an exemplary embodiment.

FIG. 2 is a three dimensional diagram for explaining a method of obtaining a panning angle of a camera 12 with respect to a target Ta, which is used in a method of controlling a camera, according to an exemplary embodiment. In FIG. 2, a reference numeral 2 indicates a three dimensional space.

Referring to FIG. 2, a plurality of reference points include a first reference point Pr1 and a second reference point Pr2, and a horizontal position of the target Ta exists on a horizontal line connecting a horizontal position of the first reference point Pr1 to a horizontal position of the second reference point Pr2 in a straight line.

Here, the panning angle for the target Ta is calculated, corresponding to a ratio (D1:D3) of a horizontal distance D1 between the first reference point Pr1 and the second reference point Pr2 to a horizontal distance D3 between the first reference point Pr1 and a horizontal position of the target Ta, on the horizontal line.

In FIG. 2, a reference symbol D2 indicates a horizontal distance between the target Ta and the second reference point Pr2, a reference symbol θ2 indicates a panning angle between the target Ta and the second reference point Pr2, and a reference symbol θ3 indicates the panning angle between the first reference point Pr1 and the target Ta.

Thus, the following equation 1 is established.

$$D1:D3=(\theta3+\theta2):\theta3 \tag{1}$$

That is, the panning angle θ3 between the first reference point Pr1 and the target Ta may be obtained by using the following equation 2.

$$\theta3=(\theta3+\theta2)\times(D3/D1) \tag{2}$$

If the panning angle of the first reference point Pr1 is θ11, the panning angle of the target Ta becomes the sum of θ11 and θ3.

Figure 3:
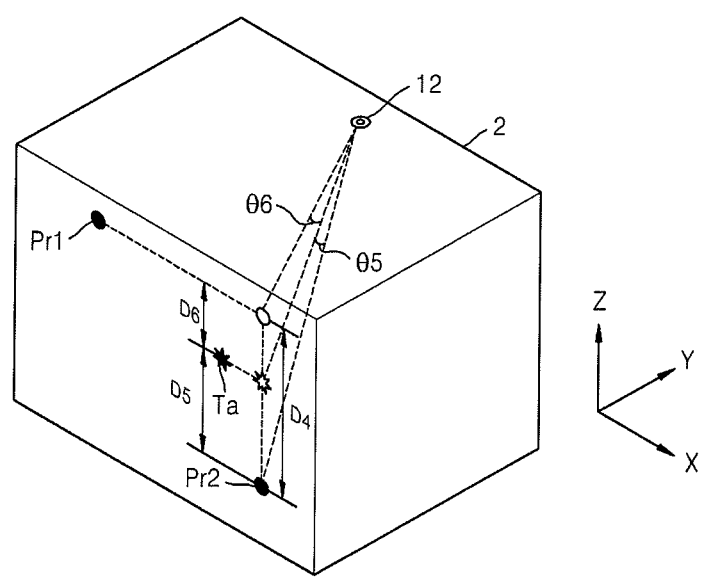
FIG. 3 is a three dimensional diagram for explaining a method of obtaining a tilting angle of a camera with respect to a target, which is used in a method of controlling a camera, according to an exemplary embodiment.

FIG. 3 is a three dimensional diagram for explaining a method of obtaining a tilting angle of a camera 12 for a target Ta, which is used in a method of controlling a camera, according to an exemplary embodiment. As stated above, in FIG. 2 and FIG. 3, like reference numerals and symbols refer to like elements throughout.

Referring to FIG. 3, a plurality of reference points include a first reference point Pr1 and a second reference point Pr2, and a vertical position of the target Ta exists on a vertical line connecting a vertical position of the first reference point Pr1 to a vertical position of the second reference point Pr2 in a straight line.

Here, the tilting angle for the target Ta is calculated, corresponding to the ratio (D4:D6) of a vertical distance D4 between the first reference point Pr1 and the second reference point Pr2 to a vertical distance D6 between the first reference point Pr1 and a vertical position of the target Ta, on the vertical line.

In FIG. 3, a reference symbol D5 indicates a vertical distance between the target Ta and the second reference point Pr2, a reference symbol θ5 indicates a tilting angle between the target Ta and the second reference point Pr2, and a reference symbol θ6 indicates the tilting angle between the first reference point Pr1 and the target Ta.

Thus, the following equation 3 is established.

$$D4:D6=(\theta6+\theta5):\theta6 \tag{3}$$

That is, the tilting angle θ6 between the first reference point Pr1 and the target Ta may be obtained by using the following equation 4.

$$\theta6=(\theta6\pm\theta5)\times(D6/D4) \tag{4}$$

If the tilting angle of the first reference point Pr1 is θ12, the tilting angle of the target Ta becomes the sum of θ12 and θ6.

Figure 4:
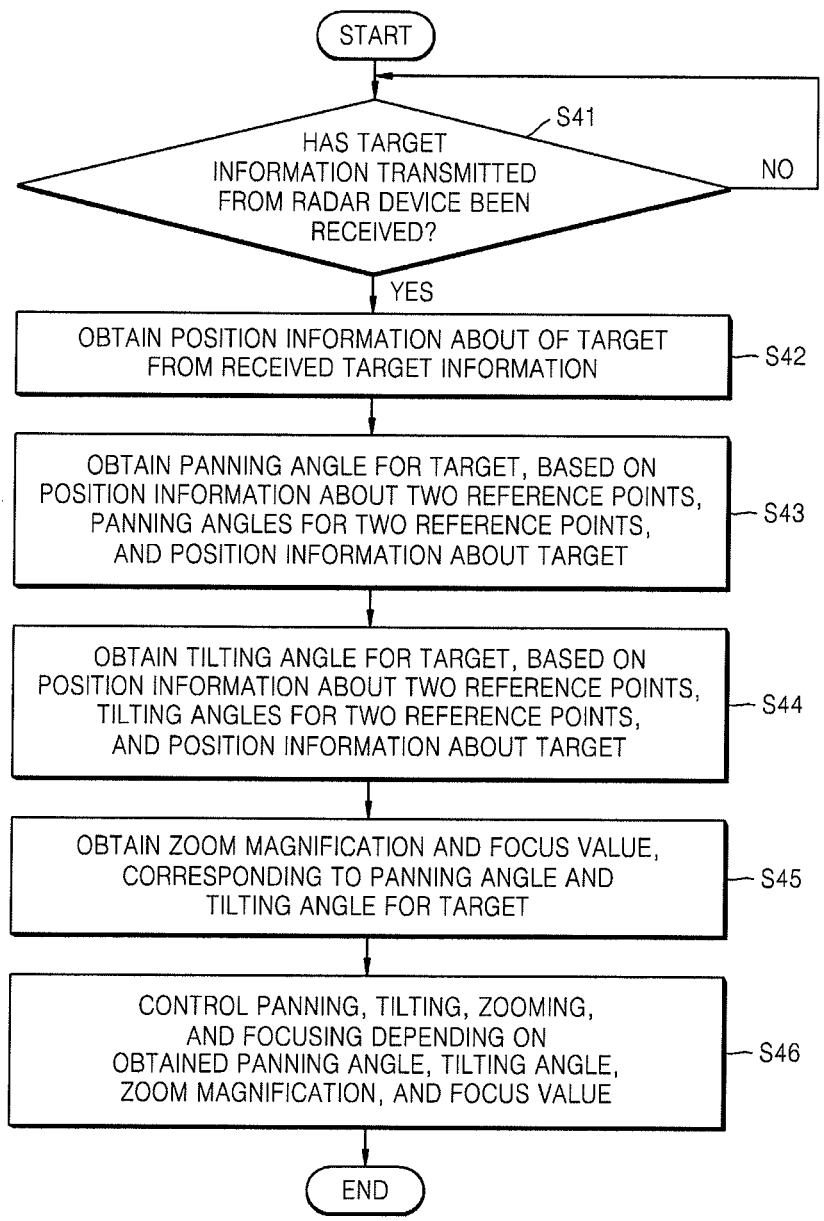
FIG. 4 illustrates a process performed by a host device of the camera of FIGS. 1 through 3 or a control unit in the camera of FIGS. 1 through 3, based on a method of controlling a camera, according to an exemplary embodiment.

FIG. 4 illustrates a process performed by the control unit of the camera 12 of FIGS. 1 through 3, based on a method of controlling a camera, according to an exemplary embodiment. As stated above, position information, such as position coordinates, about a plurality of reference points Pr1 and Pr2, and panning angles and tilting angles of the camera 12 for a plurality of reference points Pr1 and Pr2 are stored in a host device (not shown) of the camera 12 or the camera 12.

As stated above, the host device of the camera 12 and the camera 12 are connected to each other through a communication network, and perform a real time communication between them.

The process of FIG. 4 is described below with reference to FIGS. 1 through 3.

If target information transmitted from the radar device 11 is received by the host device of the camera 12 or the control unit in the camera 12 (operation S41), the host device of the camera 12 or the control unit in the camera 12 obtains position information, such as position coordinates, about the target Ta from the received target information (operation S42).

Next, the host device of the camera 12 or the control unit in the camera 12 obtains a panning angle of the camera 12 for the target Ta, based on the position information about the two reference points Pr1 and Pr2, the panning angles of the camera 12 for the two reference points Pr1 and Pr2, and the position information about the target Ta (operation S43).

Next, the host device of the camera 12 or the control unit in the camera 12 obtains a tilting angle of the camera 12 for the target Ta, based on the position information about the two reference points Pr1 and Pr2 and tilting angles of the camera 12 for the two reference points Pr1 and Pr2 and the position information about the target Ta (operation S44)

Next, the host device of the camera 12 or the control unit in the camera 12 obtains a zoom magnification and a focus value, which correspond to the panning angle and tilting angle of the camera 12 for the target Ta (operation S45).

Next, the host device of the camera 12 or the control unit in the camera 12 controls panning, tilting, zooming, and focusing of the camera 12 based on the obtained panning angle, tilting angle, zoom magnification, and focus value (operation S46).

Figure 5:
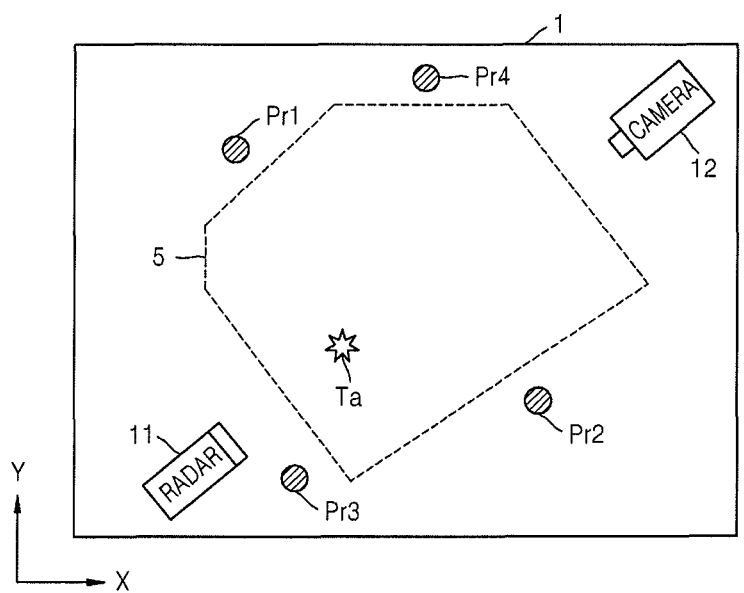
FIG. 5 is a two dimensional map diagram showing that four reference points are set, which is used in a method of controlling a camera, according to another exemplary embodiment.
Figure 6:
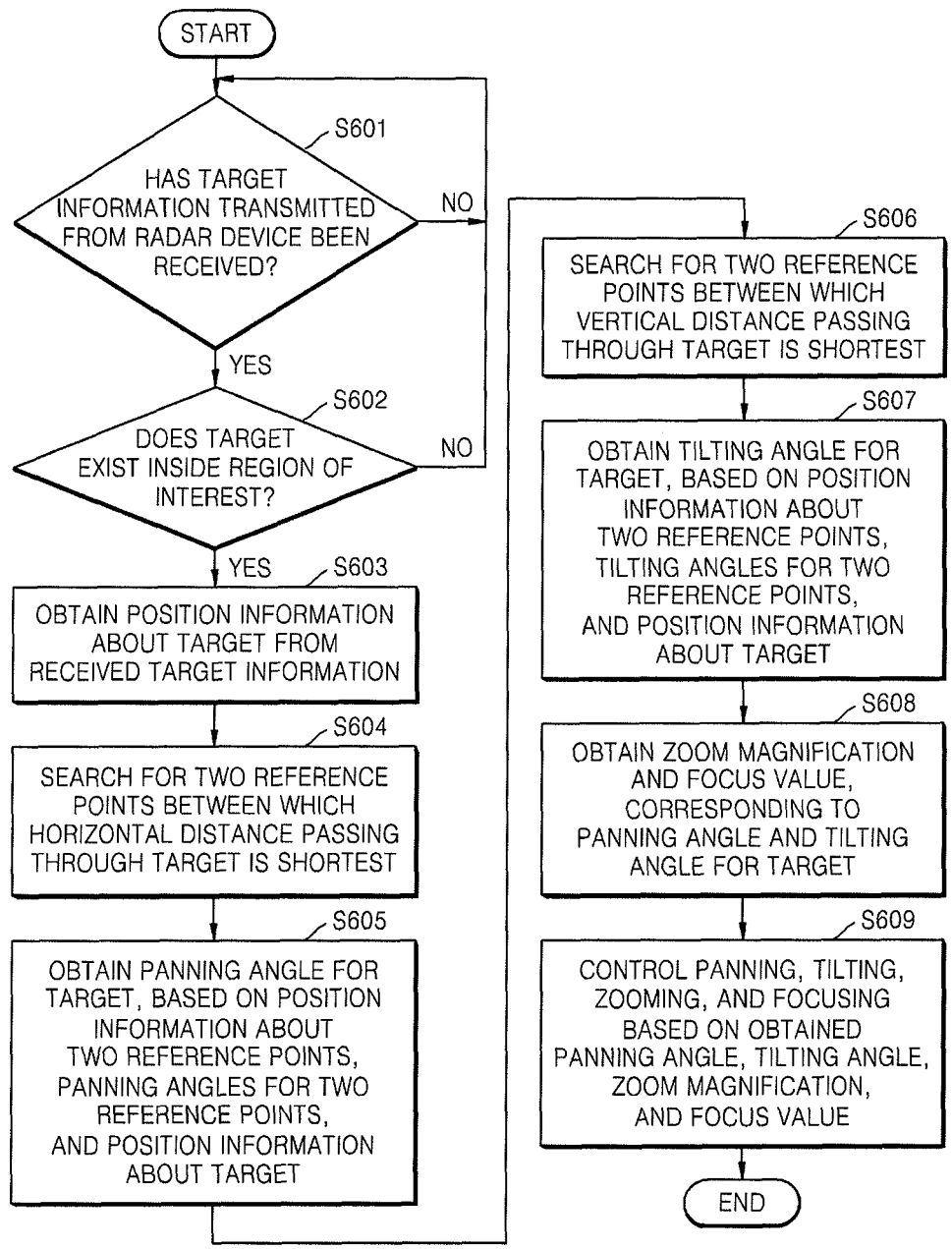
FIG. 6 illustrates a process performed by a host device of the camera of FIG. 5 or a control unit in the camera of FIG. 5, based on a method of controlling a camera, according to another exemplary embodiment.

FIG. 5 is a two dimensional map diagram showing that four reference points Pr1 through Pr4 are set, which is used in a method of controlling a camera, according to another exemplary embodiment. In FIG. 5, a reference numeral 1 indicates a two dimensional plane on the map. FIG. 6 illustrates a process performed by a control unit of a camera 12 of FIG. 5, based on a method of controlling a camera, according to an exemplary embodiment.

Comparing FIG. 5 with FIG. 1, two reference points Pr1 and Pr2 are set in the embodiment of FIG. 1, whereas, in the current embodiment of FIG. 5, four reference points Pr1 through Pr4 are set around a region of interest (ROI) 5 of a radar device 11. In addition, if a target Ta enters the ROI 5 of the radar device 11, the camera 12 tracks the target Ta by interacting with the radar device 11.

Except for these differences, the method of controlling a camera according to the current embodiment of FIG. 5 is the same as the method of controlling a camera according to the embodiment of FIG. 1. Thus, the current embodiment is described below with reference to FIGS. 5 and 6, only in terms of these differences.

If target information transmitted from the radar device 11 is received by a host device of the camera 12 or a control unit in the camera 12 (operation S601), the host device of the camera 12 or the control unit in the camera 12 determines whether a target Ta exists inside the ROI 5 (operation S602).

If the target Ta exists inside the ROI 5, the host device of the camera 12 or the control unit in the camera 12 performs the following operations.

First, the host device of the camera 12 or the control unit in the camera 12 obtains position information, such as position coordinates, of the target Ta from the received target information (operation S603).

Next, the host device of the camera 12 or the control unit in the camera 12 searches for two points between which a horizontal distance passing through the target Ta is shortest, for example, a first reference point Pr1 and a second reference point Pr2 in the case of FIG. 5 (operation S604).

Next, the host device of the camera 12 or the control unit in the camera 12 obtains a panning angle of the camera 12 for the target Ta based on position information about the two reference points Pr1 and Pr2, panning angles of the camera 12 for the two reference points Pr1 and Pr2, and the position information about the target Ta (operation S605). A horizontal position of the target Ta exists on a horizontal line connecting a horizontal position of the first reference point Pr1 to a horizontal position of the second reference point Pr2 in a straight line (refer to FIG. 2). Operation 5605 is the same as that explained in detail with reference to FIG. 2.

Next, the host device of the camera 12 or the control unit in the camera 12 searches for two points between which a vertical distance passing through the target Ta is shortest, for example, the first reference point Pr1 and the second reference point Pr2 in the case of FIG. 5 (operation S606).

Next, the host device of the camera 12 or the control unit in the camera 12 obtains a tilting angle of the camera 12 for the target Ta based on the position information about the two reference points Pr1 and Pr2, tilting angles of the camera 12 for the two reference points Pr1 and Pr2, and the position information about the target Ta (operation S607). A vertical position of the target Ta exists on a vertical line connecting a vertical position of the first reference point Pr1 to a vertical position of the second reference point Pr2 in a straight line (refer to FIG. 3). Operation S607 is the same as that explained in detail with reference to FIG. 3.

Next, the host device of the camera 12 or the control unit in the camera 12 obtains a zoom magnification and a focus value, which correspond to the panning angle and tilting angle of the camera 12 for the target Ta (operation S608).

Next, the host device of the camera 12 or the control unit in the camera 12 controls panning, tilting, zooming, and focusing of the camera 12 based on the obtained panning angle, tilting angle, zoom magnification, and focus value (operation S609).

As stated above, according to the embodiments, a panning angle and a tilting angle for a target are obtained based on position information, such as position coordinates, about reference points, panning angles and tilting angles of a camera for reference points, and position information, such as position coordinates, about the target. That is, the panning angle and tilting angle of the camera for the target are obtained by using the reference points.

Thus, a camera may track the target by interacting with a radar device without obtaining inclination information and position information about the camera.

Accordingly, it may be possible to resolve a difficulty in the related art, whereby inclination information and position information about a camera should be precisely and correctly obtained to allow the camera to track a target by interacting with the radar device. Particularly, it may be possible to resolve a difficulty in installing a camera to interact with a two dimensional radar device which is not capable of obtaining altitude information about the camera.

While the inventive concept has been particularly shown and described with reference to exemplary embodiments thereof by using specific terms, the embodiments and terms have merely been used to explain the inventive concept and should not be construed as limiting the scope of the inventive concept defined by the claims. The exemplary embodiments should be considered in a descriptive sense only and not for purposes of limitation. Therefore, the scope of the inventive concept is defined not by the detailed description of the exemplary embodiments but by the appended claims, and all differences within the scope will be construed as being included in the inventive concept.

What is claimed is:

1. A method of controlling a camera to photograph a target, the method comprising:
obtaining position information about a plurality of reference points which are positioned around the target;
obtaining panning angles and tilting angles of the camera for the reference points;
obtaining position information about the target from information about the target which is received from a radar device;
obtaining a panning angle and tilting angle of the camera for the target, based on the position information about the reference points, the panning angles and tilting angles of the camera for the reference points, and the position information about the target; and
controlling panning and tilting of the camera based on the panning angle and tilting angle of the camera for the target.

2. The method of claim 1, wherein the position information comprises position coordinates.

3. The method of claim 1, wherein the obtained position information about the reference points, and the obtained panning angles and tilting angles of the camera for the reference points are stored in a host device of the camera or in the camera, and
wherein the host device of the camera or a control unit in the camera performs the obtaining the position information about the target, the obtaining the panning angle and tilting angle of the camera for the target, and the controlling the panning and tilting of the camera.

4. The method of claim 1, further comprising:
obtaining a zoom magnification and a focus value of the camera which correspond to the panning angle and tilting angle of the camera for the target; and
controlling zooming and focusing of the camera based on the zoom magnification and the focus value.

5. The method of claim 1, wherein the obtaining the panning angle and tilting angle of the camera for the target comprises:
obtaining the panning angle of the camera for the target based on the position information about the reference points, the panning angles of the camera for the reference points, and the position information about the target; and
obtaining the tilting angle of the camera for the target based on the position information about the reference points, the tilting angles of the camera for the reference points, and the position information about the target.

6. The method of claim 1, wherein the reference points comprise a first reference point and a second reference point,
wherein a horizontal position of the target exists on a horizontal line connecting a horizontal position of the first reference point to a horizontal position of the second reference point in a straight line, and
wherein a vertical position of the target exists on a vertical line connecting a vertical position of the first reference point to a vertical position of the second reference point in a straight line.

7. The method of claim 6, wherein the obtaining the panning angle of the camera for the target comprises calculating the panning angle of the camera for the target which corresponds to a ratio of a horizontal distance between the first reference point and the horizontal position of the target to a horizontal distance between the first reference point and the second reference point, on the horizontal line.

8. The method of claim 6, wherein the obtaining the tilting angle of the camera for the target comprises calculating the tilting angle of the camera for the target which corresponds to a ratio of a vertical distance between the first reference point and the vertical position of the target to a vertical distance between the first reference point and the second reference point, on the vertical line.

9. The method of claim 6, wherein the obtaining the panning angle of the camera for the target comprises calculating the panning angle of the camera for the target which corresponds to a ratio of a horizontal distance between the first reference point and the horizontal position of the target to a horizontal distance between the first reference point and the second reference point, on the horizontal line, and wherein the obtaining the tilting angle of the camera for the target comprises calculating the tilting angle of the camera for the target which corresponds to a ratio of a vertical distance between the first reference point and the vertical position of the target to a vertical distance between the first reference point and the second reference point, on the vertical line.

10. The method of claim 1, wherein the obtaining the panning angle and tilting angle of the camera for the target is performed using a first reference point and a second reference point, among the reference points, between which a horizontal distance passing through the target is shortest, wherein a horizontal position of the target exists on a horizontal line connecting a horizontal position of the first reference point to a horizontal position of the second reference point in a straight line, and wherein the obtaining the panning angle of the camera for the target comprises calculating the panning angle of the camera for the target which corresponds to a ratio of a horizontal distance between the first reference point and the horizontal position of the target to a horizontal distance between the first reference point and the second reference point, on a horizontal line.

11. The method of claim 1, wherein the obtaining the panning angle and tilting angle of the camera for the target is performed using a first reference point and a second reference point, among the reference points, between which a vertical distance passing through the target is shortest, wherein a vertical position of the target exists on a vertical line connecting a vertical position of the first reference point to a vertical position of the second reference point in a straight line, and wherein the obtaining the tilting angle of the camera for the target comprises calculating the tilting angle of the camera for the target which corresponds to a ratio of a vertical distance between the first reference point and the vertical position of the target to a vertical distance between the first reference point and the second reference point, on a vertical line.

12. The method of claim 1, wherein the obtaining the panning angle and tilting angle of the camera for the target is performed using a first reference point and a second reference point, among the reference points, between which a horizontal distance passing through the target is shortest, and a third reference point and a fourth reference point, among the reference points, between which a vertical distance passing through the target is shortest, wherein a horizontal position of the target exists on a horizontal line connecting a horizontal position of the first reference point to a horizontal position of the second reference point in a straight line, wherein a vertical position of the target exists on a vertical line connecting a vertical position of the third reference point to a vertical position of the fourth reference point in a straight line, wherein the obtaining the panning angle of the camera for the target comprises calculating the panning angle of the camera for the target which corresponds to a ratio of a horizontal distance between the first reference point and the horizontal position of the target to a horizontal distance between the first reference point and the second reference point, on a horizontal line, and wherein the obtaining the tilting angle of the camera for the target comprises calculating the tilting angle of the camera for the target which corresponds to a ratio of a vertical distance between the third reference point and the vertical position of the target to a vertical distance between the third reference point and the fourth reference point, on a vertical line.

13. The method of claim 12, wherein the third reference point coincides with the first reference point, and the fourth reference point coincides with the second reference point.

14. The method of claim 12, wherein the third reference point coincides with the first reference point.

15. The method of claim 12, wherein the fourth reference point coincides with the second reference point.

* * * * *